United States Patent
Asati et al.

(10) Patent No.: US 8,006,131 B2
(45) Date of Patent: *Aug. 23, 2011

(54) ACTIVATING CORRECT AD-SPLICER PROFILE IN AD-SPLICER REDUNDANCY FRAMEWORK

(75) Inventors: Rajiv Asati, Morrisville, NC (US); Anil Thomas, Milpitas, CA (US); Toerless Eckert, Mountain View, CA (US)

(73) Assignee: Cisco Technology, Inc., San Jose, CA (US)

( * ) Notice: Subject to any disclaimer, the term of this patent is extended or adjusted under 35 U.S.C. 154(b) by 259 days.

This patent is subject to a terminal disclaimer.

(21) Appl. No.: 12/260,940

(22) Filed: Oct. 29, 2008

(65) Prior Publication Data

US 2010/0107001 A1 Apr. 29, 2010

(51) Int. Cl.
*G06F 11/00* (2006.01)
(52) U.S. Cl. .................. 714/13; 714/4; 725/32
(58) Field of Classification Search ............... 714/4, 10, 714/12, 13; 725/32
See application file for complete search history.

(56) References Cited

U.S. PATENT DOCUMENTS

| | | | |
|---|---|---|---|
| 6,128,666 A | 10/2000 | Muller et al. | |
| 6,487,721 B1 * | 11/2002 | Safadi | 725/36 |
| 6,798,739 B1 | 9/2004 | Lee | |
| 6,839,070 B2 | 1/2005 | Meandzija et al. | |
| 7,092,399 B1 | 8/2006 | Cheriton | |
| 7,359,377 B1 | 4/2008 | Kompella et al. | |
| 7,376,829 B2 | 5/2008 | Ranjan | |
| 7,546,619 B2 | 6/2009 | Anderson et al. | |
| 7,730,509 B2 * | 6/2010 | Boulet et al. | 725/46 |
| 2002/0178443 A1 * | 11/2002 | Ishii | 725/22 |
| 2007/0283038 A1 * | 12/2007 | Asati et al. | 709/238 |
| 2009/0132356 A1 * | 5/2009 | Booth et al. | 705/14 |
| 2009/0217318 A1 * | 8/2009 | VerSteeg et al. | 725/32 |
| 2010/0054707 A1 * | 3/2010 | Karaoguz et al. | 386/95 |

OTHER PUBLICATIONS

"MPEG-4 AVC (H.264) Ad Insertion Solution—White Paper, Revision 1.0." by Harmonic. Jul. 2007.*
"SeaChange Spot+ Software, Version 1.3, QuickSpec." by SeaChange Intl. copyright 2010.*
Swartz, Terri. "Protecting Ad Revenue Streams with SeaChange Spot+ Software—White Paper." SeaChange Intl. copyright 2005.*
"Release Notes for Cisco Gigabit-Ethernet Optimized Video Networking Solution for Cable, Release 3.0," Cisco Systems, Inc., Feb. 6, 2006, pp. 1-14.
"Solution Architecture Optimizations," Cisco Systems, Inc., Mar. 28, 2006, pp. 1-44.

* cited by examiner

*Primary Examiner* — Philip Guyton
(74) *Attorney, Agent, or Firm* — Cesari and McKenna, LLP; Michael R. Reinemann

(57) ABSTRACT

In particular embodiments, method and system for detecting a failure of a primary ad-splicer, conveying a failure information for the failed primary ad-splicer to a redundant ad-splicer, dynamically forwarding one or more pre-spliced packets intended for the failed primary ad-splicer to the redundant ad-splicer, receiving one or more post-spliced packets from the redundant ad-splicer, and transmitting the post-spliced packets towards one or more target receivers are provided.

17 Claims, 4 Drawing Sheets

ACTIVATING CORRECT AD-SPLICER PROFILE IN AD-SPLICER REDUNDANCY FRAMEWORK

TECHNICAL FIELD

The present disclosure relates to data network management. More specifically, the present disclosure relates to methods and systems for providing network based activation of N+1 redundancy for ad-splicer in an IP/MPLS network such as cable/multiple service operator (MSO) network or in a wireline network.

BACKGROUND

In a typical cable/MSO or wireline network, ad-splicer plays a significant role due to its ability to splice the advertisements or commercials into the live video streams using analog or Digital Program Insertion (DPI). More specifically, an ad-server typically stores the commercial content and streams it as MPEG digital video stream, for example, to the ad-splicer when triggered by digital cues. Using digital ad insertion standard such as SCTE35 or DVS 253 (which supports the DPI cueing message that are embedded in the single or multi program transport stream), the ad-splicer may be configured to insert the MPEG digital video stream carrying advertisement content (also referred to as 'ad stream' where ad is a short form of advertisement) into the programmer's digital video streams. The terms pre-spliced and post-spliced video traffic refer to the programmer's digital video streams before and after the ad-insertion.

A typical cable/MSO network coverage may be divided into multiple markets based on the geography and viewers. Furthermore, a single market may typically have a number of advertisement zones which may be demographically grouped areas of a market that receive the same advertising content. The advertisement zones are physically covered by hubs, which may contain devices including routers, ad-splicers, and Quadrature Amplitude Modulators (QAMs). The hubs may connect to each other and to the video headend via the IP/MPLS network. A single hub may be configured to serve one or more advertisement zones. Since each ad-splicer serves a single advertisement zone, a hub with multiple advertisement zones may include a set of multiple ad-splicers, one or more for each advertisement zone.

Video and content service providers have relied upon the ad-splicer capability to insert the appropriate advertisements or commercials into the live video streams as a substantial revenue source. Thus, ad-splicer failure or downtime has significant impact both in real time transmission service disruption as well as loss of potential revenue from advertisements or commercials which do not get transmitted. Indeed, the undesirable mean time to repair such ad-splicer failure can range from a few minutes to several hours.

Present approaches to address ad-splicer failure include human intervention, where a technician may be dispatched to the hub site to physically move the links from the failed ad-splicer to a redundant ad-splicer in the hub site.

OVERVIEW

A method in particular embodiments includes detecting a failure of a primary ad-splicer, conveying a failure information for the failed primary ad-splicer to a redundant ad-splicer, dynamically forwarding one or more pre-spliced packets intended for the failed primary ad-splicer to the redundant ad-splicer, receiving one or more post-spliced packets from the redundant ad-splicer, and transmitting the post-spliced packets towards one or more target receivers.

A method in particular embodiments includes receiving a primary ad-splicer failure information, indexing a correct ad-splicer profile from a pre-populated list, activating the indexed ad-splicer profile for splicing usage, and deactivating the indexed ad-splicer profile when the primary ad-splicer becomes available.

DESCRIPTION OF EXAMPLE EMBODIMENTS

Figure 1:
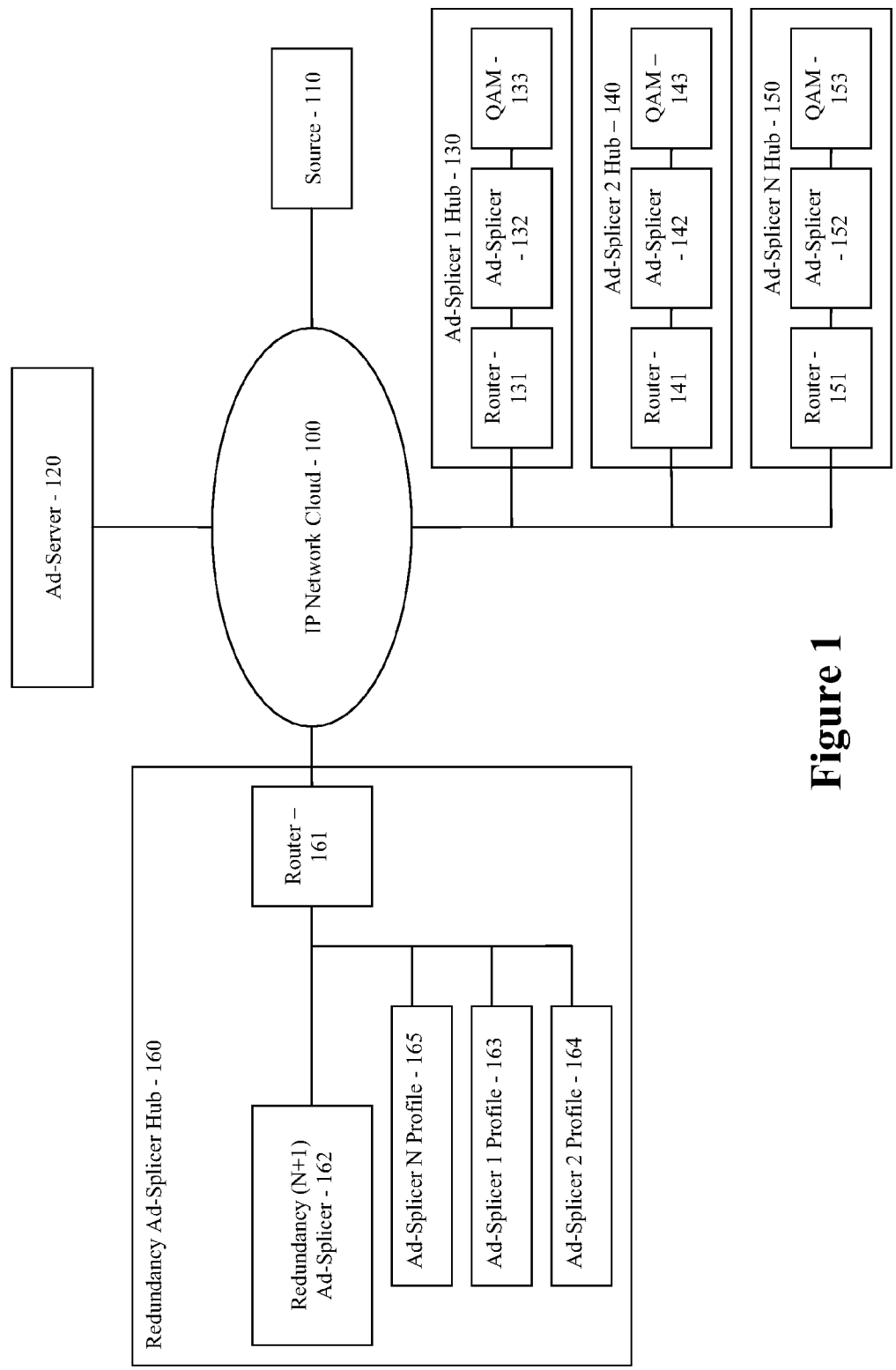
FIG. 1 is a block diagram of a data and content network for practicing one or more embodiments of the present disclosure.

FIG. 1 is a block diagram of a data and content network for practicing one or more embodiments of the present disclosure. Referring to FIG. 1, a data and content network may include an IP network cloud 100 for communication between video headend devices such as, among others, a video content source 110 or an ad-server 120. The network may also include one or more primary ad-splicer hubs 130, 140, 150, each of which may include a router 131, 141, 151, an ad-splicer 132, 142,152, and one or more receivers such as QAM 133, 143, 153, as well as one or more redundancy ad-splicer hubs 160, each of which may include a router 161 and a redundancy ad-splicer 162. In one embodiment of the present disclosure, the redundant ad-splicer may be pre-populated with one or more profiles 163, 164, 165, wherein each profile may correspond to the one or more primary ad-splicers 132, 142, 152 on the network.

Referring still to FIG. 1, in one embodiment of the present disclosure, when one of the primary ad-splicers 132, which is configured to receive and transmit multicast traffic, fails, the corresponding primary ad-splicer router 131, that is directly connected to the primary ad-splicer 132, within the primary ad-splicer hub 130, may withdraw the route to the primary ad-splicer 132 from its routing protocol database, and then may convey the unreachability to routing neighbors in the IP network 100. Upon the routing protocol convergence, the router 161 that is connected to the redundant ad-splicer 162 may install the route to the IP address of the failed primary ad-splicer 132 in its routing table with a next-hop of the redundant ad-splicer 162, and advertise this route to the routing neighbors in IP network 100. This route may be statically configured with extremely high admin-distance on the redundant ad-splicer router 161. This route installation may facilitate the router 161 to automatically reroute to the redundant ad-splicer 162, the traffic, which may include the ad stream and the pre-spliced video stream, originally intended for the failed primary ad-splicer 132.

In another embodiment, the redundant ad-splicer router 161 may send one or more unicast Internet Control Message Protocol (ICMP) packets to the redundant ad-splicer 162, encoding the IP address of the failed primary ad-splicer 132. The IP address of the failed primary ad-splicer 132 may be used to index the correct ad-splicer profile 163 from a pre-populated profile list. The indexed profile 163 may keep the information, such as the source and destination IP addresses of the pre-spliced and post-spliced video streams, and ad-server IP address for the corresponding primary ad-splicer 132, thus enabling the redundant ad-splicer 162 and router 161, to make the post-spliced video streams available to the interested primary ad-splicer routers.

In yet another embodiment of the present disclosure, the redundant ad-splicer router 161, upon receiving a routing protocol update, such as an indication of the failure of primary ad-splicer 132, from primary ad-splicer router 131, may send a routing protocol update to the redundant ad-splicer 162, withdrawing the IP address of the failed primary ad-splicer 132. The IP address of the failed primary ad-splicer 132, which may be encoded within the received update, may be used by redundant ad-splicer 162 to index the correct ad-splicer profile 163 from a pre-populated profile list. The indexed profile 163 may keep information for the corresponding primary ad-splicer 132, such as the source and destination IP addresses of the pre-spliced and post-spliced video streams, and the ad-server IP address, thus enabling the redundant ad-splicer 162 and router 161, to make the post-spliced video streams available to the interested primary ad-splicer routers, including router 131.

The redundant ad-splicer 162, upon activating the appropriate profile containing primary ad-splicer configuration information, may execute the ad-insertion on the pre-spliced video traffic using the ad traffic, encode the appropriate source and destination IP addresses, and transmit the post-spliced video traffic to the router 161. Thereafter, the post-spliced video traffic may be delivered to the intended receivers such as QAM 133 via the router 131. It should be noted that within the scope of the present disclosure, the redundant ad-splicer hub 160 may be configured to support multiple primary ad-splicer hubs 130, 140, 150, in the event that any of the primary ad-splicers 132, 142, 152 fails.

In yet another embodiment, two or more redundant ad-splicer hubs 160 may be configured to support one or more primary ad-splicer hubs 130, 140, 150, in the event that one or more of the primary ad-splicers 132, 142, 152 fails.

In yet another embodiment of the present disclosure, the programmer's video traffic may be IP multicasted such that the video content source may send the traffic destined to an IP address, referred to as Group IP address, belonging to the 224.0.0.0/8 range representing more than one receiver. The multicasted traffic may be delivered on the source or shared multicast tree towards the interested receivers. The tree may be setup using a protocol such as Protocol Independent Multicast (PIM). In another embodiment, the programmer's video traffic may be IP unicasted to a single receiver.

Referring still to FIG. 1, in one embodiment of the present disclosure, using Protocol Independent Multicast—Source Specific Multicasting (PIM-SSM), the primary ad-splicer router 131 may build the source-group (S,G) multicast tree towards the redundant ad-splicer router 161, which may be connected to the redundant ad-splicer 162, substantially immediately after the routing protocol convergence upon the failure of a primary ad-splicer 132, as the route to the corresponding multicast source becomes available via the redundant ad-splicer router 161. This source-group (S,G) multicast tree facilitates the delivery of the multicast traffic from the source to one or more receivers. Thus, the post-spliced video traffic may be delivered from the redundant ad-splicer router 161 towards the primary ad-splicer router 131 over this multicast tree via the network 100. The primary ad-splicer router 131, in turn, may forward the IP multicast traffic to the Internet Group Management Protocol (IGMP) receivers including QAM 131. Referring still to FIG. 1, in the case where Protocol Independent Multicast in Sparse Mode (PIM-SM) is used in the network 100, the redundant ad-splicer router 161 may register with the rendezvous-point (RP) upon receiving the post-spliced multicast traffic from the redundant ad-splicer 162. The rendezvous point may then build the source-group multicast tree to the redundant ad-splicer router 161 to receive the multicast traffic natively. Additionally, another multicast tree may also be setup to forward the native IP multicast traffic from the rendezvous point towards the primary ad-splicer router 131, which, in turn, may forward the IP multicast traffic to the IGMP receivers including QAM 131.

Referring still to FIG. 1 the multicast routers, such as the primary ad-splicer routers 131, 141, 151 and the redundant ad-splicer routers 161, may be configured to maintain the state regarding the incoming and outgoing interfaces for each source-group and/or (*,G). The maintained state is used to determine which data packets are to be discarded and which are to be forwarded. The state information may be maintained in a multicast routing table by each multicast router 131, 141, 151, 161, where each entry in the multicast routing table may correspond to a unique source-group (S,G) pair or (*,G) pair, referred to as an mroute, wherein each mroute may contain at least four types of entries—(1) address of the multicast group, (2) address of the corresponding source, (3) the incoming interface, and (4) a list of outgoing interfaces.

Referring back to FIG. 1, in one embodiment of the present disclosure, the redundant ad-splicer 162 may be connected to the router 161 in the network 100 via an interface, such as namely gig1/1, and may be configured to dynamically activate a primary ad-splicer profile containing at least one mapping table. More specifically, the redundant ad-splicer 162 in one embodiment is configured to accept multicast traffic (S1, G1) intended for the primary ad-splicer 132 without sending out an (S1,G1) IGMP join on the interface gig1/1 to the router 161. Upon receiving the multicast traffic (S1,G1), the redundant ad-splicer 162 may splice the pre-spliced multicast traffic with ad traffic, and generate the post-spliced multicast traffic with (S2,G2) IP addresses. The (S2,G2) IP address is obtained through the mapping table which maps or associates the IP addresses (S1,G1) of the incoming pre-spliced video traffic to the IP addresses (S2,G2) of the outgoing multicast traffic.

The router 161 may be configured with the floating unicast static routes with the next hop as the gig1/1, with admin distance of 254, for example. In one embodiment, the floating unicast static routes may include the IP addresses of the primary ad-splicers receiving the ad traffic. More specifically, each static route may be destined to an IP address of the primary ad-splicer 132 that is configured to receive the ad traffic as well as pre-spliced multicast traffic for one or more Group addresses (including G1). For example, in one embodiment of the present disclosure, the floating static route may be configured on router 161 as follows:

router (conf)#ip route<S1> gig1/1 254
router (conf)#ip route<S2> gig1/1 254 where S1 represents the IP address used by the primary ad-splicer to receive the ad traffic, and further, where S2 represents the IP address used by the primary ad-splicer as the source IP address of the post-spliced multicast traffic.

In this manner, as described above, in one embodiment, the floating unicast static route may be installed in the routing table of the router 161 connected to the redundant ad-splicer 162 (and other routers in the network) if the advertised routes to the IP addresses S1, S2 from primary ad-splicer router 131, respectively, are not available, for example, in the event of the primary ad-splicer 132 failure.

Referring again to FIG. 1, the router 161 in one embodiment of the present disclosure may also be configured with an artificially high metric value, which is close to maximum, such as "15555555" in case of Open Shortest Path First (OSPF) or "3294967295" in case of Intermediate System to Intermediate System (ISIS), for example, so that the devices and terminal connected to the network 100 do not prefer the path to the redundant ad-splicer router 161. That is, when the primary ad-splicer 132 returns back to functional service in the network 100, the IGP converges, and each network device immediately starts using the primary ad-splicer 132. For example, the redundant ad-splicer router 161 may be configured with "redistribute static metric "15555555" within the IGP (that is, OSPF or ISIS). This configuration is provided so that the devices connected to the network 100 prefer the routes to the primary ad-splicer 132, if available and functional. In one embodiment, the following routine may be used to configure the redundant ad-splicer router 161:

router ospf 1
    redistribute static metric 15555555

In another embodiment, the following routine may be used to configure router 161:

router isis
    redistribute static ip metric 3294967295

It is to be noted that while "15555555" is used in the description above to represent an artificially high metric value, other artificially high values may be used (where the highest value being 0xFFFFFE=16777214), such that routes to the primary ad-splicer 132 is always preferred in the network 100 by the network devices if the primary ad-splicer 132 is available.

Referring still to FIG. 1, in the manner described above, in one embodiment of the present disclosure, the redundant ad-splicer router 161 may be configured to dynamically inject the reverse mroute when the primary ad-splicer 132 fails. That is, in one embodiment, during the primary ad-splicer 132 failure, the router 161 connected to the redundant ad-splicer 162 may be configured to dynamically assign the static IGMP group membership to the redundant ad-splicer 162. A terminal or device in the network 100 may transmit an IGMP membership report message to join a multicast group, where the IGMP is common to all multicast router protocols, and isolates end users from the routing protocol in use.

In this manner, during the time period when the primary ad-splicer 132 is in failure mode, the redundant ad-splicer 162 may be configured to receive the relevant pre-spliced video traffic intended for the primary ad-splicer 132 so that the network 100 may be configured to dynamically modify the delivery of the pre-spliced video traffic to the redundant ad-splicer 162 during primary ad-splicer 132 failure, and to deliver the post-spliced video traffic to the intended receivers such as QAM 133 during the primary ad-splicer 132 failure.

In this manner, within the scope of the present disclosure, one redundant ad-splicer 162 may be configured to back up more than one primary ad-splicer in the various hub sites in the regional access network, using the individual primary ad-splicer profiles 163, 16, 165, to ensure the ad traffic is forwarded to the correct corresponding primary ad-splicer hub 130, 140, 150. In addition, overall mean time to repair (MTTR) may be substantially improved by configuring the network 100 to converge and dynamically provide the redundancy, in addition, to obviating the need for on-site repair at the hub site of the failed primary ad-splicer.

Figure 2:
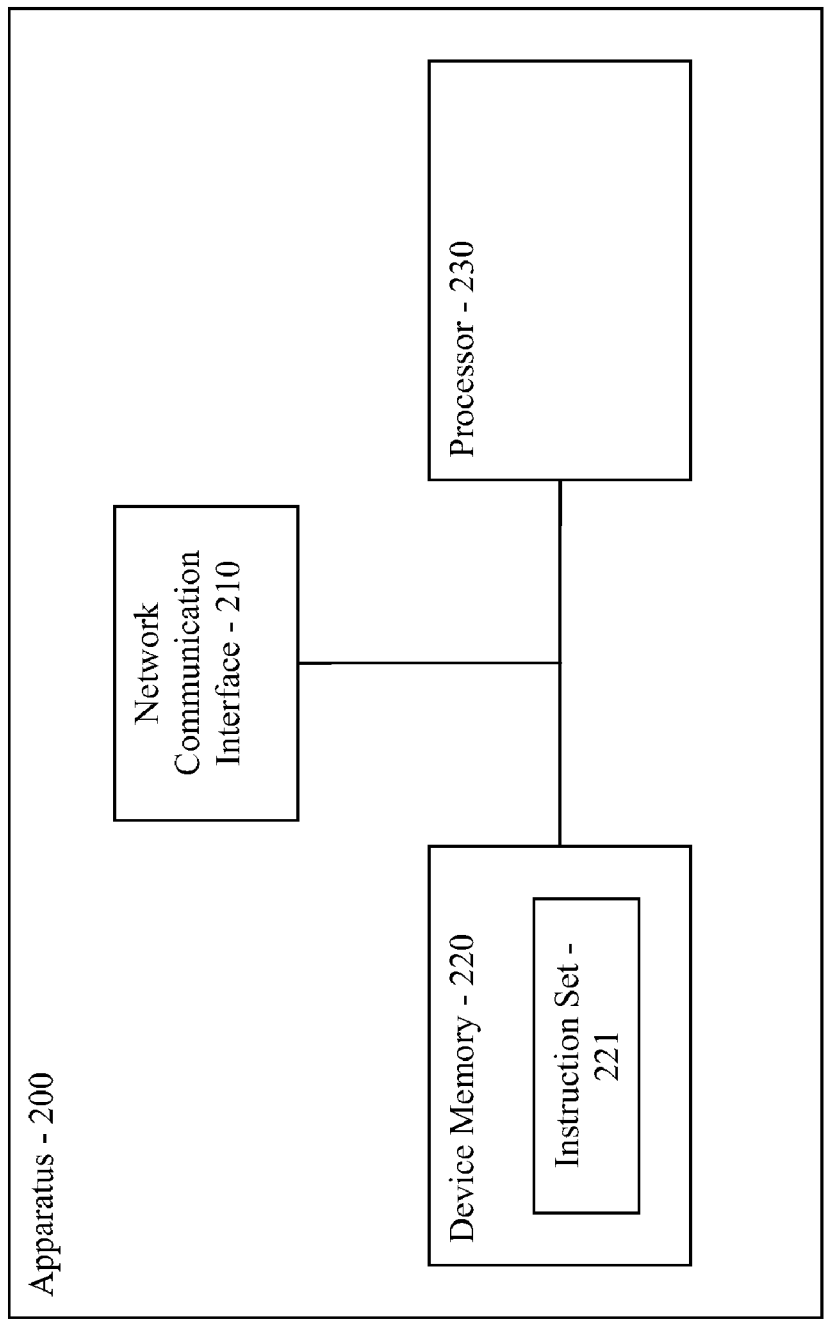
FIG. 2 is a representation of an apparatus for practicing one or more embodiments of the present disclosure.

FIG. 2 is a representation of an apparatus for practicing one or more embodiments of the present disclosure. Referring to FIGS. 1 and 2, the apparatus 200 of one embodiment of the present disclosure, may include a network communication interface 210, coupled to one or more processors 230, which may execute a set of instructions 221 encoded onto a memory 220. The instruction set 221 encoded onto the memory 220 may be a set of instructions that, when executed by the one or more processors, defines a method of providing an ad-splicer redundancy in a network, further including a method of indexing a set of pre-populated profiles 163, 164, 165 for each of the primary ad-splicers 132, 142, 152 on the network for forwarding ad traffic from the redundant ad-splicer hub 160 to the correct corresponding primary ad-splicer router 131 for forwarding to a receiver such as a QAM 133.

Figure 3:
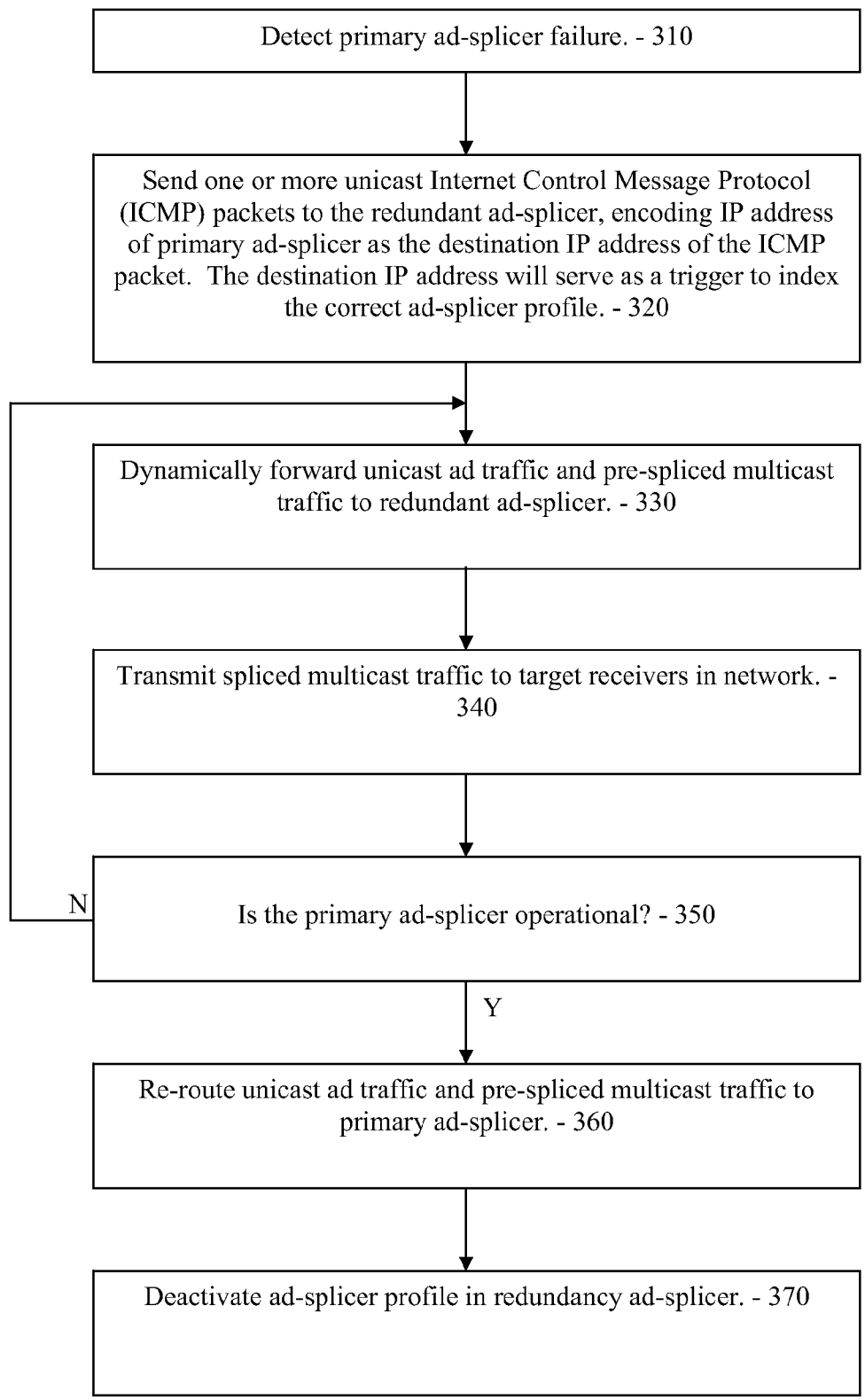
FIG. 3 is a flow chart illustrating the commands executed for ad-splicer redundancy by the redundant ad-splicer router for one or more embodiments of the present disclosure.

FIG. 3 is a flow chart illustrating the commands executed for ad-splicer redundancy by the redundant ad-splicer router for one or more embodiments of the present disclosure. Referring to FIGS. 3 and 1, the redundant ad-splicer router 161 may first determine if the primary ad-splicer 131 is operational. Once the failure of the primary ad-splicer has been determined 310, one or more unicast Internet Control Message Protocol (ICMP) packets may be sent by the redundant ad-splicer router 161 to the redundant ad-splicer 162, encoding the IP address of the failed primary ad-splicer 320. The IP address of the primary ad-splicer may also be the destination IP address of the ICMP packets and may be used by the redundant ad-splicer 162 as a trigger to index the correct ad-splicer profile 163, that may include information such as the (S,G) address of the post-spliced video traffic and ad-server IP address, for constructing the appropriate IP header of the post-spliced video traffic, which may be forwarded towards the interested receivers, such as primary ad-splicer router 132, which would forward the traffic to the IGMP receivers such as a QAM 133.

Referring back to FIG. 3, in one embodiment of the present disclosure, the redundant ad-splicer router may dynamically forward the unicast ad traffic and the pre-spliced multicast traffic to the redundant ad-splicer 330. In another embodiment within the scope of the present disclosure, the installation of a floating static route towards a redundant ad-splicer for the purposes of forwarding and receiving unicast and multicast traffic may be another option. Once spliced, the redundant ad-splicer router may then transmit the post-spliced multicast traffic 340, as per the indexed profile, to the target receivers in the network 100 via the correct primary ad-splicer router. Once the ad traffic has been spliced and transmitted by the redundant ad-splicer, a check may be performed to determine if the previously failed primary ad-splicer is once again operational 350. In the case that the primary ad-splicer is still in failure mode, the redundant ad-splicer router may continue to dynamically forward unicast ad traffic and pre-spliced multicast traffic to the redundant ad-splicer, and post-spliced multicast traffic from the redundant ad-splicer to the interested receivers as per the method above, using the same indexed primary ad-splicer profile determined from the IP address of the failed primary ad-splicer 330-350.

Referring still to FIG. 3, in the case that the previously failed primary ad-splicer becomes operational, the redundant ad-splicer router may remove the static route from the routing table, and re-route unicast ad traffic and pre-spliced multicast traffic back to the primary ad-splicer 360 for ad-splicing operation as normal. The redundant ad-splicer hub may then deactivate the current primary ad-splicer profile in the redundant ad-splicer 370 and await the next detection of a failed primary ad-splicer.

Figure 4:
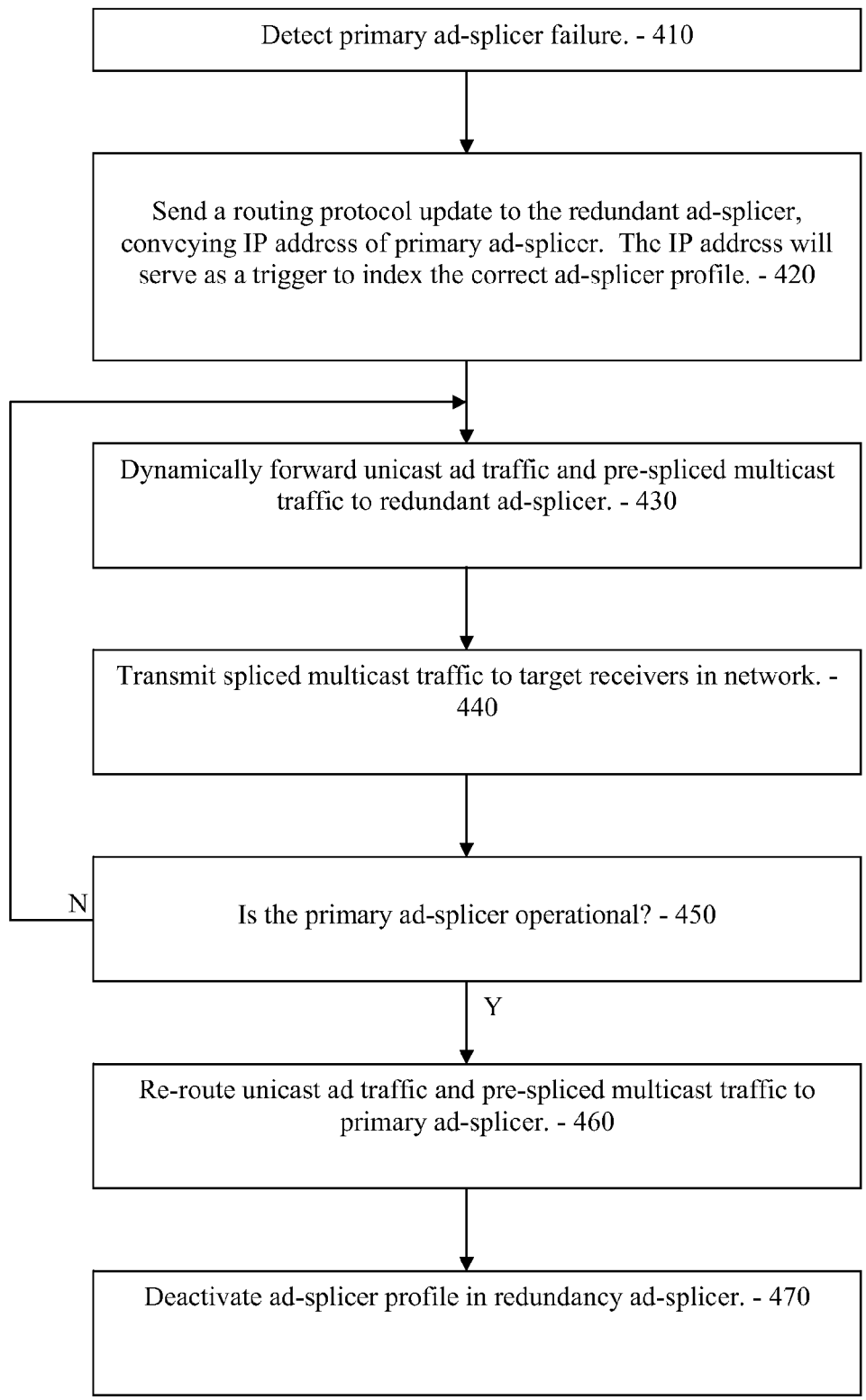
FIG. 4 is a flow chart illustrating the commands executed for ad-splicer redundancy by the redundant ad-splicer router for one or more embodiments of the present disclosure.

FIG. 4 is a flow chart illustrating the commands executed for ad-splicer redundancy by the redundant ad-splicer router for one or more embodiments of the present disclosure. Referring to FIGS. 4 and 1, the redundant ad-splicer router 161 may first determine if the primary ad-splicer 131 is operational. Once the failure of the primary ad-splicer has been determined 410, a routing protocol update may be sent to the redundant ad-splicer 162, conveying the IP address of the failed primary ad-splicer 420. The IP address of the primary ad-splicer may also be the destination IP address of the ICMP packet, and may be used by the redundant ad-splicer as a trigger to index the correct ad-splicer profile 163, that may include information such as the (S,G) address of the post-spliced video traffic, for constructing the appropriate IP header of the post-spliced video traffic, which may be forwarded towards the interested receivers such as primary ad-splicer router 132, which may forward the traffic to the IGMP receivers such as a QAM 133

Referring back to FIG. 4, in one embodiment of the present disclosure, the redundant ad-splicer router may dynamically forward the unicast ad traffic and the pre-spliced multicast traffic to the redundant ad-splicer 430. In another embodiment within the scope of the present disclosure, the installation of a floating static route towards a redundancy ad-splicer for the purposes of forwarding and receiving unicast and multicast traffic may be another option. Once spliced, the redundant ad-splicer router may then transmit the multicast traffic to the target receiver in the network via the correct primary ad-splicer router as determined by the indexed profile 440. Once the ad traffic has been spliced and transmitted by the redundant ad-splicer, a check may be performed to determine if the previously failed primary ad-splicer is once again operational 450. In the case that the primary ad-splicer is still in failure mode, the redundant ad-splicer router may then continue to dynamically forward unicast ad traffic and pre-spliced and post-spliced multicast traffic to the redundant ad-splicer and the destination receivers as per the method above, using the same indexed primary ad-splicer profile determined from the IP address of the failed primary ad-splicer 430-450.

Referring still to FIG. 4 in the case that the previously failed primary ad-splicer becomes operational, the redundant ad-splicer router may then re-route unicast ad traffic and pre-spliced multicast traffic back to the primary ad-splicer 460 for ad-splicing operation as normal. The redundant ad-splicer hub may then deactivate the current primary ad-splicer profile in the redundant ad-splicer 470 and await the next detection of a failed primary ad-splicer.

Accordingly, a method in particular embodiments includes detecting a failure of a primary ad-splicer, conveying a failure information for the failed primary ad-splicer to a redundant ad-splicer, dynamically forwarding one or more pre-spliced packets intended for the failed primary ad-splicer to the redundant ad-splicer, receiving one or more post-spliced packets from the redundant ad-splicer, and transmitting the post-spliced packets towards one or more target receivers.

In one aspect, conveying a failure information for the failed primary ad-splicer to a redundant ad-splicer may include using a failure detection as a trigger to formulate one or more Internet Control Message Protocol (ICMP) packets, encoding an Internet Protocol (IP) address of the failed primary ad-splicer in the one or more ICMP packets, and transmitting the one or more ICMP packets to the redundant ad-splicer.

In a further aspect, conveying a failure information for the failed primary ad-splicer to a redundant ad-splicer may include sending one or more routing protocol updates to the redundant ad-splicer, wherein the routing protocol updates convey the unreachability of the Internet Protocol (IP) address of the failed primary ad-splicer.

In still another aspect, the method may include detecting availability of the previously failed primary ad-splicer, and forwarding one or more pre-spliced packets to the primary ad-splicer.

Also, dynamically forwarding one or more pre-spliced packets intended for the failed primary ad-splicer to the redundant ad-splicer may include provisioning a static route to the IP address of primary ad-splicer with the next-hop interface being the interface to the redundant ad-splicer, and assigning an artificially high value to the static route so that it is preferred only if the other route to the primary ad-splicer becomes unavailable due to primary ad-splicer failure.

A method in another aspect may include receiving a primary ad-splicer failure information, indexing a correct ad-splicer profile from a pre-populated list, activating the indexed ad-splicer profile for splicing usage, and deactivating the indexed ad-splicer profile when the primary ad-splicer becomes available.

In another aspect, receiving the primary ad-splicer failure information may include receiving one or more Internet Control Message Protocol (ICMP) packets.

Further, indexing the correct ad-splicer profile may include parsing an Internet Protocol (IP) address of the failed primary ad-splicer from the received one or more ICMP packets, and using an Internet Protocol (IP) address of the failed primary ad-splicer as a trigger to index the correct ad-splicer profile.

Additionally, receiving a primary ad-splicer failure information may include receiving one or more routing protocol updates conveying the unreachability of an Internet Protocol (IP) address of the failed primary ad-splicer.

In yet still a further aspect, indexing a correct ad-splicer profile may include using the IP address of the failed primary ad-splicer as a trigger to index the correct ad-splicer profile.

Also, activating the indexed ad-splicer profile for splicing usage in particular embodiments may include loading at least one indexed profile associated with the splicing usage, updating a mapping database with the mapping of input (S,G) with output (S,G) addresses, and using the mapping entry to transmit the post-spliced multicast video packets.

Further, the ad-splicer profile may be deactivated when the pre-spliced packets are no longer received for a predefined period of time.

In another aspect, the ad-splicer profile may be deactivated when a routing protocol message conveying the reachability of the IP address of the restored primary ad-splicer is received.

An apparatus in still another aspect includes a network interface, one or more processors coupled to the network interface, and a memory for storing instructions which, when executed by the one or more processors, detects a failure of a primary ad-splicer, conveys a failure information for the failed primary ad-splicer to a redundant ad-splicer, dynamically forwards one or more pre-spliced packets intended for the failed primary ad-splicer to the redundant ad-splicer, receives one or more post-spliced packets from the redundant ad-splicer; and transmits the post-spliced packets towards one or more target receivers.

In still another aspect, the memory for storing instructions which, when executed by the one or more processors may be configured to convey a failure information for the failed primary ad-splicer to a redundant ad-splicer, the memory for storing instructions which, when executed by the one or more processors uses a failure detection as a trigger to formulate one or more Internet Control Message Protocol (ICMP) packets, encodes an Internet Protocol (IP) address of the failed primary ad-splicer in the one or more ICMP packets, and transmits the one or more ICMP packets to the redundant ad-splicer.

Further, the memory for storing instructions which, when executed by the one or more processors may be configured to convey a failure information for the failed primary ad-splicer to a redundant ad-splicer, the memory for storing instructions which, when executed by the one or more processors sends one or more routing protocol updates to the redundant ad-splicer, wherein the routing protocol updates convey the unreachability of the Internet Protocol (IP) address of the failed primary ad-splicer.

Still in another aspect, the memory for storing instructions which, when executed by the one or more processors may be configured to detect availability of the previously failed primary ad-splicer, and forwards one or more pre-spliced packets to the primary ad-splicer.

An apparatus in still another embodiment includes a network interface, one or more processors coupled to the network interface, and a memory for storing instructions which, when executed by the one or more processors, receives a primary ad-splicer failure information, indexes a correct ad-splicer profile from a pre-populated list, activates the indexed ad-splicer profile for splicing usage, and deactivates the indexed ad-splicer profile when the primary ad-splicer becomes available.

In yet still another aspect, the memory for storing instructions which, when executed by the one or more processors may be configured to receive the primary ad-splicer failure information includes receiving one or more Internet Control Message Protocol (ICMP) packets.

In this manner, in particular embodiments, during the time period when the primary ad-splicer 132 is in failure mode, the redundant ad-splicer 162 may be configured to receive the relevant pre-spliced video traffic intended for the primary ad-splicer 132 such that the network 100 may be configured to dynamically modify the delivery of the pre-spliced video traffic to the redundant ad-splicer 162 during primary ad-splicer 132 failure, and to deliver the post-spliced video traffic to the intended receivers such as QAM 133 during the primary ad-splicer 132 failure.

Accordingly, in particular embodiments, one redundant ad-splicer 162 may be configured to back up more than one primary ad-splicer in the various hub sites in the regional access network, using the individual primary ad-splicer profiles 163, 16, 165, to ensure the ad traffic is forwarded to the correct corresponding primary ad-splicer hub 130, 140, 150. In addition, overall mean time to repair (MTTR) may be substantially improved by configuring the network 100 to converge and dynamically provide the redundancy, in addition, to obviating the need for on-site repair at the hub site of the failed primary ad-splicer.

In the manner described above, in particular embodiments, method and system for activating the correct primary ad-splicer profile in an N+1 ad-splicer redundancy framework by detecting a failed primary ad-splicer and facilitating a redundant ad-splicer activation during the duration of the fail mode of the primary ad-splicer are provided. A pre-populated list of primary ad-splicer profiles may be used by the redundant ad-splicer, upon notifying by the connected router, to index and activate the profile for the failed primary ad-splicer to ensure receiving of pre-spliced video traffic and transmitting of post-spliced video traffic from the redundant ad-splicer towards intended receivers previously served by the failed primary ad-splicer.

What is claimed is:

1. A method, comprising:
   detecting a failure of a primary ad-splicer;
   conveying a failure information for the failed primary ad-splicer to a redundant ad-splicer;
   dynamically forwarding one or more pre-spliced packets intended for the failed primary ad-splicer to the redundant ad-splicer;
   receiving one or more post-spliced packets from the redundant ad-splicer; and
   transmitting the post-spliced packets towards one or more target receivers,
   wherein conveying a failure information for the failed primary ad-splicer to a redundant ad-splicer comprises:
   using a failure detection as a trigger to formulate one or more Internet Control Message Protocol (ICMP) packets;
   encoding an Internet Protocol (IP) address of the failed primary ad-splicer in the one or more ICMP packets; and
   transmitting the one or more ICMP packets to the redundant ad-splicer.

2. The method of claim 1, wherein conveying a failure information for the failed primary ad-splicer to a redundant ad-splicer comprises sending one or more routing protocol updates to the redundant ad-splicer, wherein the routing protocol updates convey an unreachability of an Internet Protocol (IP) address of the failed primary ad-splicer.

3. The method of claim 1, further comprising:
   detecting availability of the previously failed primary ad-splicer; and
   forwarding one or more pre-spliced packets to the primary ad-splicer.

4. The method of claim 1, wherein dynamically forwarding one or more pre-spliced packets intended for the failed primary ad-splicer to the redundant ad-splicer comprises:
   provisioning a static route to an IP address of the primary ad-splicer with a next-hop interface being an interface to the redundant ad-splicer; and
   assigning an artificially high value to the static route so that it is preferred only if a route to the primary ad-splicer becomes unavailable due to primary ad-splicer failure.

5. A method, comprising:
   receiving a primary ad-splicer failure information;
   indexing a correct ad-splicer profile from a pre-populated list;
   activating the indexed ad-splicer profile for splicing usage; and
   deactivating the indexed ad-splicer profile when the primary ad-splicer becomes available.

6. The method of claim 5 wherein receiving the primary ad-splicer failure information includes receiving one or more Internet Control Message Protocol (ICMP) packets.

7. The method of claim 6, wherein indexing the correct ad-splicer profile comprises:
   parsing an Internet Protocol (IP) address of the failed primary ad-splicer from the received one or more ICMP packets; and
   using an Internet Protocol (IP) address of the failed primary ad-splicer as a trigger to index the correct ad-splicer profile.

8. The method of claim 5, wherein receiving a primary ad-splicer failure information comprises receiving one or more routing protocol updates conveying an unreachability of an Internet Protocol (IP) address of the failed primary ad-splicer.

9. The method of claim 5 wherein indexing a correct ad-splicer profile comprises using an IP address of the failed primary ad-splicer as a trigger to index the correct ad-splicer profile.

10. The method of claim 5, wherein activating the indexed ad-splicer profile for splicing usage comprises:
   loading at least one indexed profile associated with the splicing usage;
   updating a mapping database with a mapping of input (S,G) with output (S,G) addresses; and
   using a mapping entry to transmit post-spliced multicast video packets.

11. The method of claim 8, wherein the ad-splicer profile is deactivated when pre-spliced packets are no longer received for a predefined period of time.

12. The method of claim 8 wherein the ad-splicer profile is deactivated when a routing protocol message conveying reachability of the IP address of the restored primary ad-splicer is received.

13. An apparatus, comprising:
   a network interface;
   one or more processors coupled to the network interface;
   a memory for storing instructions which, when executed by the one or more processors,
      detects a failure of a primary ad-splicer,
      conveys a failure information for the failed primary ad-splicer to a redundant ad-splicer,
      dynamically forwards one or more pre-spliced packets intended for the failed primary ad-splicer to the redundant ad-splicer,
      receives one or more post-spliced packets from the redundant ad-splicer, and
      transmits the post-spliced packets towards one or more target receivers,
   wherein the memory for storing instructions which, when executed by the one or more processors, conveys a failure information for the failed primary ad-splicer to a redundant ad-splicer:
      uses a failure detection as a trigger to formulate one or more Internet Control Message Protocol (ICMP) packets,
      encodes an Internet Protocol (IP) address of the failed primary ad-splicer in the one or more ICMP packets, and
      transmits the one or more ICMP packets to the redundant ad-splicer.

14. The apparatus of claim 13, wherein the memory for storing instructions which, when executed by the one or more processors
   conveys a failure information for the failed primary ad-splicer to a redundant ad-splicer, and
   sends one or more routing protocol updates to the redundant ad-splicer, wherein the routing protocol updates convey an unreachability of an Internet Protocol (IP) address of the failed primary ad-splicer.

15. The apparatus of claim 13, wherein the memory for storing instructions which, when executed by the one or more processors
   detects availability of the previously failed primary ad-splicer, and
   forwards one or more pre-spliced packets to the primary ad-splicer.

16. An apparatus, comprising:
   a network interface;
   one or more processors coupled to the network interface;
   a memory for storing instructions which, when executed by the one or more processors,
      receives a primary ad-splicer failure information,
      indexes a correct ad-splicer profile from a pre-populated list,
      activates the indexed ad-splicer profile for splicing usage, and
      deactivates the indexed ad-splicer profile when the primary ad-splicer becomes available.

17. The apparatus of claim 16 wherein the memory for storing instructions which, when executed by the one or more processors receives the primary ad-splicer failure information includes receiving one or more Internet Control Message Protocol (ICMP) packets.

* * * * *